SHEET-HANDLING APPARATUS

Filed Sept. 22, 1965

INVENTOR
JOHN PAUL JONES, JR.

BY Watson, Cole, Grindle & Watson
ATTORNEYS

INVENTOR
JOHN PAUL JONES, JR.
BY Watson, Cole, Grindle & Watson
ATTORNEYS

INVENTOR
JOHN PAUL JONES, JR.
BY
Watson, Cole, Grindle & Watson
ATTORNEYS

United States Patent Office 3,424,452

Patented Jan. 28, 1969

3,424,452

SHEET-HANDLING APPARATUS

John P. Jones, Jr., Wynnewood, Pa., assignor to Navigation Computer Corporation, a corporation of Pennsylvania Filed Sept. 22, 1965, Ser. No. 489,171

U.S. Cl. 271—29 7 Claims

Int. Cl. B65h *3/08, 1/06;* G03b *1/24*

ABSTRACT OF THE DISCLOSURE

A sheet feeder for small coded cards similar to portions of punch paper tape having sprocket holes along the card length is fashioned to feed wrinkled or distorted cards in alignment at constant speed past an electronic reading station. The ends of the cards are bent from their place on the bottom of a stack by means of a pneumatic picker to engage a continuously rotating sprocket wheel which engages the card sprocket holes to orient the card feed and convey the cards past a reading station at constant speed. The cards are not conveyed from the stack by the picker means but by the rotating sprocket wheel. Individual cards may be fed by programming the position of the pneumatic picker relative to the bottom of the card stack, and certain bending angles are introduced for straightening wrinkles in the cards.

The present invention relates to sheet-handling apparatus and more particularly to an apparatus capable of operating on a stack of sheets to separate the end sheet from the stack and to feed the same at a constant speed past a utilization station despite wrinkles or damaged edges on the sheets caused by handling.

Data processing machines and computers are becoming more and more widely used in the merchandising field for accounting and stock control purposes. It has recently been proposed to provide information on cards or tags that are directly attached to the merchandise and to remove a portion of said card or tag when a sale is made for processing in remote unitized readers for delivery of the information on the cards to a centralized computer system. For this purpose, the cards are precoded with punched holes or the like that indicates all of the sales data needed for use in the automatic tabulation operation by the computer system.

Various machines are known that can operate satisfactorily on regular size data cards where the cards have not been wrinkled or creased by handling and where the edges of the cards are perfectly straight for feeding and guiding purposes. However, difficulties have been encountered in separating and feeding a stack of cards or sheets that are small in comparison to the regular size data cards and which have been wrinkled, or damaged along the edges due to handling such as is necessary when the clerk in a store removes the desired portion of the card upon completion of a sale.

More specifically, if known prior art devices utilizing rotary suction wheels and/or picker belts are used to process cards that have been handled and are thus wrinkled, experience has shown that difficulties are encountered in efficiently separating the cards from the stack and feeding the same past a utilization station wherein a conventional readerhead or puncher operates on the cards. The difficulty that most frequently arises in such prior art devices is the mis-feed and jam-up of the cards that results from the fact that the pickers are unable to grip the wrinkled or warped cards because of the uneven surfaces presented to the frictional surface of the picker means. Another difficulty arises in that such cards as are of sufficiently small size to be easily attached to the merchandise do not present a sufficient surface area for gripping the sheet by conventional frictional grippers in an efficient manner for separating and feeding. However, even if the sheet is gripped, these frictional devices have proven to be unsatisfactory in imparting to the card a constant forward speed so that the readout or other operation can be performed immediately on the card as it leaves the stack. Further, if the cards are not of perfect dimension and contain random variations in thickness and/or quality, then the feeding of the cards with prior art devices becomes even more unsatisfactory with the friction feeders just described since if the friction surfaces presented are different with each card then the cards will be fed in a non-uniform manner.

Accordingly, it is one object of the present invention to provide a sheet-handling apparatus for use with high-speed data processing machines and computers.

It is another object of the present invention to provide a unitized, compact sheet-handling apparatus for use with centralized high-speed data processing machines and computers.

It is also an object of the present invention to provide a device of the character described that is relatively simple in design and construction and thus inexpensive so that large scale use of remote card readers with centralized computer systems is now economically feasible.

It is another object of the present invention to provide a sheet-handling apparatus that overcomes the shortcomings mentioned above so as to be capable of handling imperfect sheets such as merchandise labels which have been manhandled, wrinkled or damaged on the edges.

It is a further object of the present invention to provide a sheet-handling apparatus that is capable of operating on cards that are smaller in dimensions than have heretofore been possible.

It is still another object of the present invention to provide a sheet-handling apparatus of the character described that can feed the sheets or cards being handled directly from the stack and past a utilization station such as a photo-sensitive readhead at a perfectly linear rate of speed for efficient data transmission.

Essentially, the apparatus of the present invention is designed and constructed so as to enable small, imperfect cards to be separated and fed past the utilization station by providing the cards to be operated upon with a longitudinally aligned row of apertures and snatch means having outwardly extending elements for successively engaging the rearwardly facing edges of the apertures of a withdrawn portion of the card for rapidly feeding the sheet in the forward direction and out of the stack upon actuation of said snatch means. In the preferred embodiment disclosed, this snatch means takes the form of a sprocket wheel having a series of tapered sprockets extending from the peripheral surface of said wheel, and a pneumatic withdrawing means is provided that engages at least a portion of the end sheet of the stack to bring the row of apertures into driving engagement with the sprockets. Since the sprockets positively engage the rearwardly facing edges presented by the row of apertures, the sheets are fed from the stack without slippage between the sheet and the driving means and since the base of the sprockets in the preferred embodiment illustrated are substantially the same size as the apertures, the cards are simultaneously aligned in both a longitudinal and transverse direction without the use of the side or end edges of the card that might be imperfect or damaged.

According to another aspect of the present invention, the cards are given a transverse bend during the withdrawing movement of the card from the stack so that any longitudinal wrinkles that might be present on the sheet are substantially eliminated for insuring positive engagement of the feeding apertures by the sprocket wheel and for insuring accurate placement of the sheet with respect to the utilization means. This transverse bend in the sheet may be formed by the pneumatic withdrawing means of the device of the present invention that is positioned adjacent the forward portion of the end sheet in the stack. More particularly, a pneumatic manifold is positioned transversely of the stack of sheets and in abutting relationship with the end sheet of said stack and has a plurality of pneumatic picker fingers that extend outwardly therefrom in the forward direction to withdraw the forward portion of the sheet from the stack and to pivot the same about the surface of the attached manifold. In this manner, the fibers of the cards are distorted in the region of the manifold so as to substantially eliminate any longitudinal component of wrinkles that might be present on the card due to handling and the like.

In addition, the sheet may be provided with additional transverse bends as it is withdrawn from the stack in accordance with the teaching of the present invention. For example, the readerhead which is just downstream of the card stack may be or is formed with a smooth leading surface and is positioned in the feed path of the sheet during the forward movement out of the stack to such an extent that the sheet is provided with a bend in the transverse direction. This bend not only serves to smooth the sheet but also serves to maintain pressure by the sheet against the readerhead by the springiness of the sheet itself, thus further assuring accurate placement of said sheet with respect to the readerhead. Also, in accordance with the present invention, the pneumatic fingers may be provided with a pair of flat surfaces that intersect at an angle with the remainder of said fingers so as to provide an additional bend in a transverse direction in the card.

In accordance with still another aspect of the present invention there is provided in conjunction with the picker fingers that serve to withdraw the end sheet from the stack a novel mechanism to impart the required sequential rotation or oscillation of the manifold. Specifically, an outwardly extending arm is fixed to the manifold to impart the desired motion to the manifold and the picker fingers; an electromagnet serving to pivot the arm so as to rotate the manifold to a first position wherein the picker fingers are adjacent said stack for receiving the end sheet therefrom and a spring being provided for biasing said arm in the opposite direction so as to rotate the manifold to a second position for withdrawal and engagement of said end sheet with the snatch means, whereby said engagement between said sheet and said snatch means is limited by the strength of said spring. The advantage of this arrangement lies in the fact that the sheet is resiliently held in engagement with the rotating sprocket wheel by a force that is desirably limited by the strengh of the spring so that driving engagement between the sprockets and the apertures on the sheet can be readily effected without a tendency to damage the aligned apertures.

Thus, it is another object of the present invention to provide a sheet handling apparatus which employs a mechanism for imparting positive separation and feed motion to the end sheet of a stack that is capable of operating on sheets that are wrinkled; that are of non-uniform quality or thickness; and, that are damaged along the edges or corners.

A still further object of the present invention is to provide an apparatus of the character described which is capable of operation at high speed in such a manner as to allow utilization of the card at a position just downstream of the stack at, for example, a photosensitive readerhead.

Another object of the present invention is to provide a sheet-handling apparatus of the character described that will effect alignment of the sheets in both directions without the use of the side or end edges of the sheet.

It is still another object of the present invention to provide a sheet-handling apparatus that substantially eliminates wrinkles that might be present on the sheets as they are being withdrawn from the stack.

It is a further object of the present invention to provide an improved sheet-handling apparatus that functions to eliminate wrinkles in the critical portions of the sheet as it is being snatched from the stack and fed past the reader or punch mechanism.

It is another object of the present invention to provide a sheet-handling apparatus wherein is embodied a picker mechanism of simple construction wherein the withdrawing force of the picker mechanism is spring-actuated and thus limited by the strength of the spring.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

Referring now to the drawings.

Figures 1, 5:
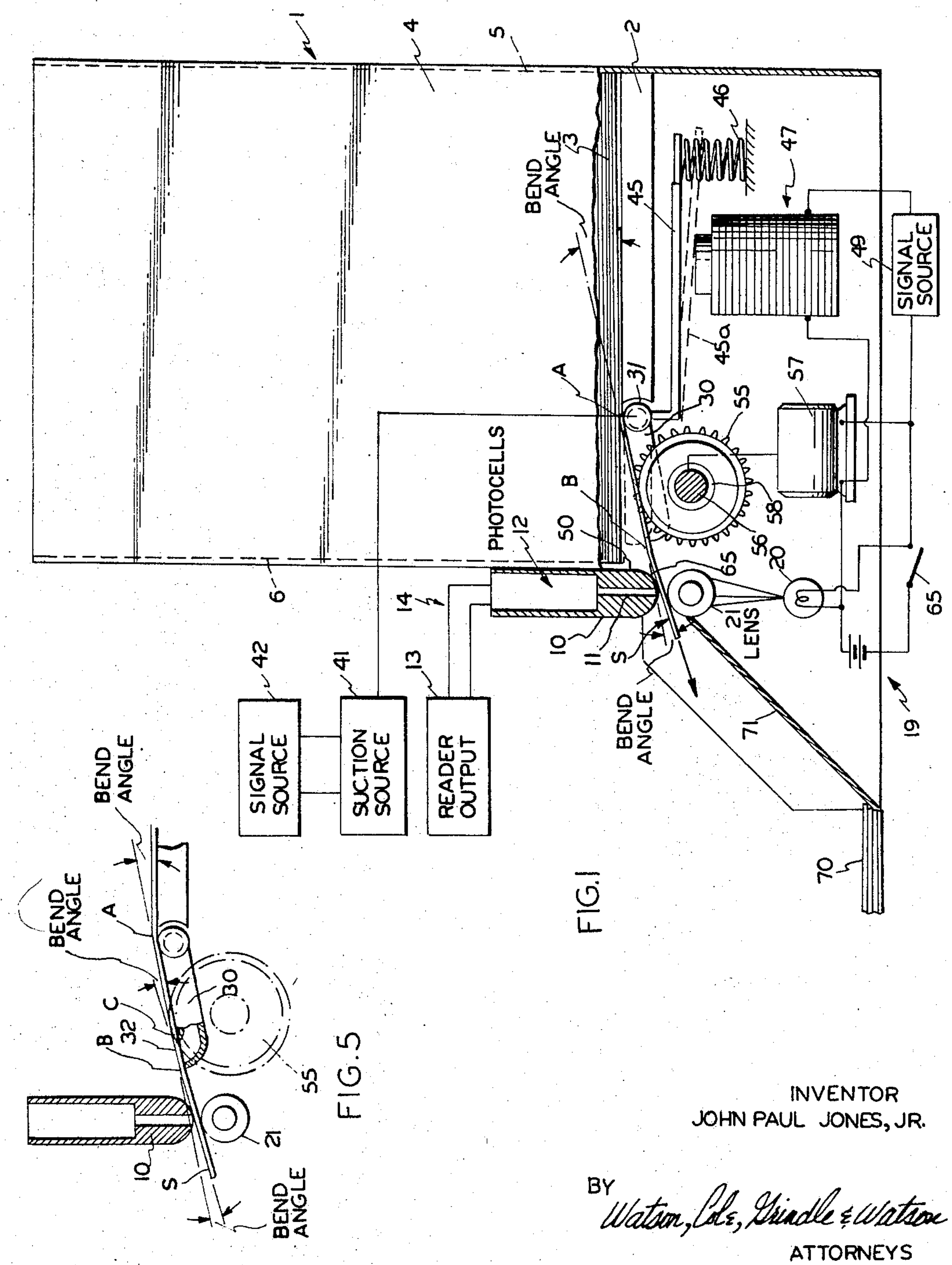
FIGURE 1 is a diagrammatical illustration of the sheet-handling apparatus of the present invention with parts broken away to show the operating mechanism.
Figure 3:
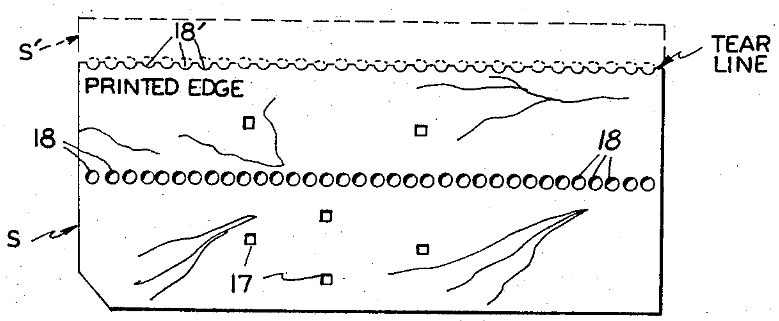
FIG. 3 is a top view of a punch card of the type that is capable of use in the machine constructed in accordance with the present invention.
Figures 2, 3A, 4:
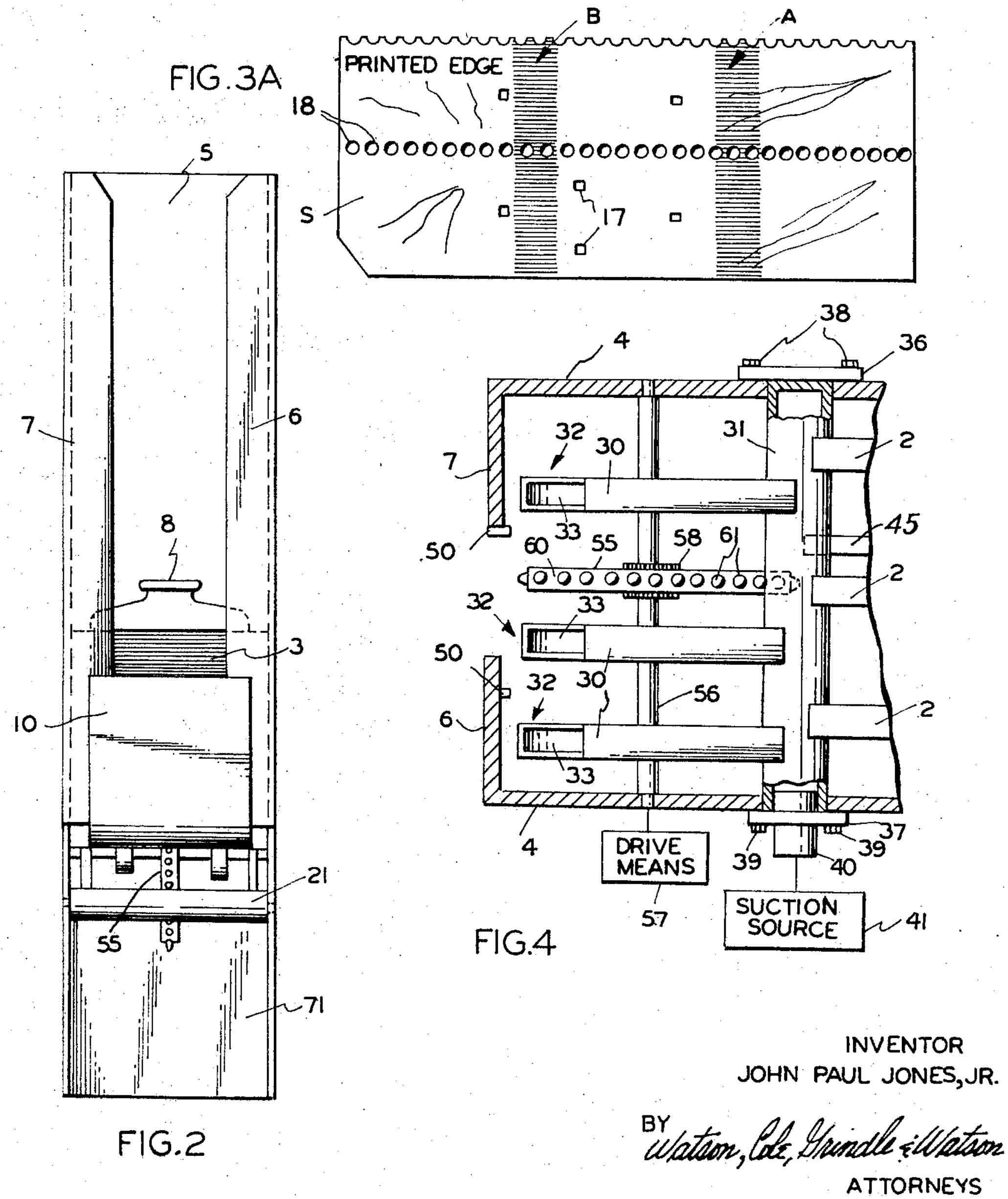
FIG. 2 is a front elevational view of the device illustrated in FIG. 1.
Figure 6:
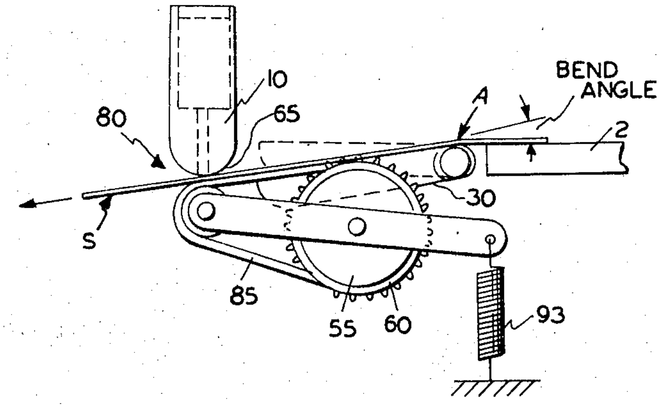
Figure 7:
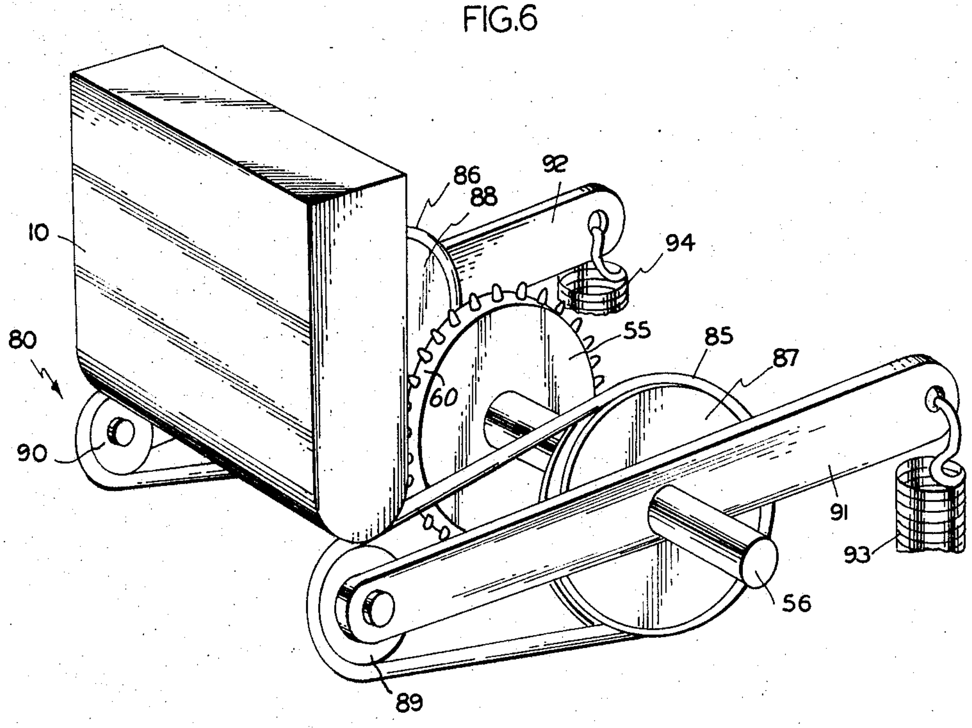

FIG. 3*a* is another view of the card of FIG. 3 showing bends in a transverse direction on said card;

FIG. 4 is a top view of the forward portion of the card hopper of the apparatus illustrated in FIG. 1;

FIG. 5 is an illustration of a modification of a portion of the mechanism illustrated in FIG. 1;

FIG. 6 shows a modification of the machine of FIG. 1 wherein a variable throat is provided at the readerhead;

FIG. 7 is a perspective view with parts omitted for clarity showing the variable throat mechanism of FIG. 5.

It will be remembered that the preferred embodiment of the invention shown can be utilized with a small punch card, of the type illustrated in FIG. 3 and generally represented by the reference indicia S, that has been coded with merchandising information to be read at a readerhead for transmission to a remote computer for processing. For ease of illustration then, the following detailed description will be directed to such an arrangement, although it is to be understood that the device of the invention can be used with other types of utilization means such as a punchead, and that other kinds of sheets can be operated on, if desired.

Referring now to FIGURES 1, 2 and 4 of the drawings, the sheet-handling apparatus constructed in accordance with the principles of the invention comprises a hopper, generally designated by the reference numeral 1, having a plurality of spaced platform bars 2 for supporting a stack of cards 3 in readiness for the separating and feeding operation. The hopper 1 may be of any conventional construction including a pair of side walls 4, a rear wall 5 and a pair of channel members 6, 7 forming a front wall, all for confinement of the stack of sheets 3 in a vertical direction, as can best be seen in FIG. 2. A slot is provided between the forward channel members 6, 7 that affords easy access to the hopper 1 for positioning the stack of cards 3 therein. A conventional card weight 8 is provided to urge the stack of cards 3 into firm engagement with the platform 2.

Removably attached to the front channel members 6, 7 by any number of fasteners (not shown) is a readerhead 10 that operates on each card S as it is fed forward out of the stack 3. The readerhead 10 includes any number of spaced fiber optic elements 11 corresponding to the number of data-bearing channels provided on the card S, which, in operation, abuts the terminal end of the fiber optic elements in reading engagement. The other end of each of the fiber elements 11 communicate with a suitable photo-sensitive mechanism, such as a diode or the like, generally represented by the reference number 12. The diode 12 is interconnected to a remote reader output or computer 13 over suitable electric transmission wires, generally represented by the reference numeral 14.

The particular type of card S that is contemplated for use with the photo-sensitive readerhead 10 of the preferred embodiment illustrated is shown in FIG. 3. The card S has been previously punched in the usual manner to provide any number of data-bearing holes 17 that are arranged in the usual columns and which represent the data desired to be recorded at the reader output 13. Also, prepunched on the card S is a series of apertures 18 that are arranged in a longitudinally extending row, as illustrated. These apertures 18, in contrast to the holes 17, do not bear any information to be recorded at the reader output 13 but are used for driving purposes, as will be later explained in detail. In addition, any amount of printed matter may be introduced on the card, such as along the upper edge as indicated in this figure.

If desired, the card S can be removably attached to an additional length of card S', indicated in dashed lines in FIG. 3, by a second series of apertures 18' aligned along the tear line. The additional length of card S' can be data-bearing and attached to the garment or other merchandise being sold so that the card S can be easily removed for processing at the time of the sale by tearing along the row of apertures 18' while the length of card S' can be retained for use by the customer. The apertures 18' can be designed for use as feed holes during the previous punching operation for convenience.

Referring back to the discussion of the readerhead 10, it will now be recognized by those skilled in this art that the data-bearing holes 17 in the card S cooperate with the corresponding elements 11 to produce the output signal of the system. For example, by providing an electrical circuit 19 including a suitable light source 20, a light beam is directed through a cylindrical lens 21 for cooperation with the punch holes 17 in the cards to produce the desired output to the computer 13. In order for the output to be fed directly into a data processing machine or computer system without intermediate storage, it is necessary that the cards be removed from the stack 3 in succession and then fed past the readerhead 10 with a smooth, constant motion so that the electronic pulses will be accurately distinguished. For this purpose the novel card separating and feeding mechanism is provided and will now be described.

As best illustrated in FIGS. 1 and 4, a plurality of picker fingers 30 are provided on a transverse pivotal manifold 31 which is located just forward of the platform 2. The fingers 30 extend in the longitudinal direction toward the front of the hopper 1 and terminate in upwardly directed faces, generally represented by the reference numeral 32. The picker fingers 30 are hollow along their longitudinal axes; an orifice 33 at the face 32 of the fingers 30 representing the terminal end of the internal passage of the fingers 30. Likewise, the transverse manifold 31 is hollow and the interior passage of the manifold 31 communicates with each of the interior passages of the picker fingers 30. The manifold 31 is journaled for pivotal rotation in the side walls 4 and retained in position by opposed endplates 36, 37 which are fastened to the side walls 4 by any number of suitable fastening bolts 38, 39, respectively. A pipe 40 extends through the endplate 37 and is fixedly secured thereto so as to provide an air-tight rotatable joint between said pipe 40 and the manifold 31. The pipe 40 is connected to any suitable suction source 41 controlled by a signal source 42 whereby the terminal faces 32 of the picker fingers 30 can be activated at the proper time with suction at the orifices 33 to attract the forward portion of the end card S of the stack 3 whereby the withdrawing operation is initiated.

According to an important aspect of the present invention, means are provided to sequentially rotate or pivot the manifold 31 about an axis transverse to the stack of cards 3. As best shown in FIG. 1, this means comprises an arm 45 fixed at one end thereof to the bottom of the manifold 31 and a spring 46 at the other end of said arm to bias the same upwardly and in a counter-clockwise direction about the axis of said manifold 31. An electromagnet, generally represented by the reference numeral 47, is disposed beneath the arm 45, which is, in this case, formed of metal, and serves to rotate the manifold 31 in a clockwise direction by attracting the arm 45 to move the mechanism against the force of the spring 46 to a dotted-line position 45*a* in response to a signal indicating that a sheet-feeding operation is to be initiated from a suitable signal source 49. As indicated in FIG. 1, when the picker fingers 30 are pivoted about the axis of the manifold 31 to the limit in the clockwise direction, the suction faces 32 will be disposed adjacent the end card S so that said card S can be attracted to said face for the deflecting operation. As soon as the card S has been attached to the picker fingers 30 by suction, the electromagnet 47 is de-activated by the proper signal from the signal source 49 so that the spring 46 is operative to rotate the manifold 31 and the picker fingers 30 in the counter-clockwise direction to complete the deflecting movement of the forward portion of the card S.

As the withdrawing operation is effected, it can be seen in FIG. 1 that a transverse bend is created in the end card S about the pivoting manifold 31, as generally represented by the reference indicia A. This bend A in the end card S is through an angle sufficiently large to cause the adjacent sheets in the stack 3 which may have adhered to the end card S to separate therefrom and spring back to the normal position in readiness for the next cycle. A bend angle of about 10° has been found to be sufficient for this purpose, however, larger or smaller angles may be used as conditions (for example, the quality of the cards being processed) change.

If desired, a pair, or any suitable number of rearwardly extending projections 50 can be mounted along the bottom end of the forward channel members 6, 7 to aid in the separating operation by flicking the forwardmost part of each end card S as it is withdrawn. The projections 50 also serve to maintain the substantial air gap between the dotted line and the full-line positions of the picker fingers 30 so that a sheet will not be attracted by the suction faces 32 until the picker fingers 30 have been moved to said dotted-line position.

In the line of travel of the forward portion of the end card S as it is withdrawn from the stack 3, is a sprocket wheel 55 mounted on a transversely extending shaft 56 which is journaled for rotation by the side plates 4. A motor 57 is connected to the shaft 56 and through a pair of collars 58 said motor 57 serves to continuously rotate the sprocket wheel 55. The sprocket wheel 55 presents an outer peripheral surface 60 with a series of sprockets 61 projecting outwardly therefrom, said sprockets 61 being substantially conical in configuration and aligned with the series of co-operating apertures 18 formed in each card S, as shown in FIG. 3. The base of each of the sprockets 61 is substantially equal in cross-sectional area to the apertures 18 and thus when the card S is brought down into engagement with the peripheral surface 60 of the wheel 55, then the sprockets 61 serve to align and position the card S in both the longitudinal and transverse directions.

Thus, as will now be evident, upon movement of the arm 45 to the full-line position of FIG. 1 by means of the spring 46, the picker fingers 30 will serve to bring the apertures 18 in the forward portion of the card S down into engagement with respective sprockets or projections 61 whereby the sheet is immediately aligned in both the transverse and longitudinal directions, as just discussed, and driving engagement between the wheel 55 and the card S is effected. Thus, upon rotation of the sprocket wheel 55, the rearwardly-facing edges of the apertures 18 are drivingly engaged by the sprockets 61 to snatch the card S from the position where the forward portion of said card S has been withdrawn from the stack by the picker fingers 30 and rapidly feed the same in the direction indicated by the solid arrow in this figure. Because of the fact that the sprockets 61 positively engage the rearwardly facing edges of the apertures 18, the card S is immediately brought to a full, constant speed well before the first data hole 17 is aligned with the fiber optic element 11 of the readerhead 10.

The readerhead 10 has a rounded and smooth rear face 65 that is in the path of movement of the forward edge of the card S during the initial moments of forward movement of said card S from the stack 3. This smooth, curved surface 65 serves to press the card S downwardly as it passes under the readerhead 10 whereby a second transverse bend B is created at a line along the forward end of the suction faces 32, as best illustrated in FIG. 1.

As previously indicated, the presence of these transverse bends A and B tends to smooth out any wrinkles or creases that might be present in the card S during the separating and feeding operations of the device of the present invention. The smoothing out of the sheets is illustrated in FIG. 3*a* and is caused by the favorable distortion of the fibers in the card S at the points indicated. In other words, the fibers along the upper surface of the card S are stretched and the fibers along the lower surface of said card S are compressed within their elastic limits so that the effect of previous distortions that have caused wrinkles due to the manhandling of the cards are minimized, i.e., these intentionally induced bends along a transverse axis serve to negate the previously induced distortion by temporarily realigning the fibers of the sheet in a longitudinal direction. This smoothing out of the forward portion of the card S results in efficient and rapid engagement of the sprockets 61 with the apertures 18 so that the driving engagement is effected and maintained without slippage or relative movement until the whole card S has been withdrawn and fed past the readerhead 10.

It has been found that the sprocket wheel can be rotated to effect reading of the cards at a rate of 30 characters per second with good results in terms of maintaining a smooth, continuous motion of said cards past the readerhead 10 although it is to be understood that other speeds can be used if desired. In any case, it has been found that with the use of the device of the present invention, the smooth action of the card passing the readerhead 10 allows the output to be fed directly into a remote computer system without the need for intermediate storage as is necessary in prior art devices of which I am aware.

In addition to the function given above, the transverse bend B also serves to press or urge the card S against the readerhead 10 whereby the area of the card passing said readerhead 10 forms a light seal with the operative surface to prevent stray light beams from hitting the end of the fiber optic 11. This, of course, advantageously reduces the noise level of the photoelectric mechanism 12 for an improved signal-to-noise ratio of the photo-electric system.

To summarize the operation, assume that the suction source 41 is connected to the manifold 31 and that the electrical circuit 9 is completed by closing switch 65 to energize the light 20 and the motor 57. Then, assume that the electromagnet 47 is energized though the signal source 49 so that the bar 45 will be attracted to the electromagnet 47 so as to pivot to the dashed-line position **45*a* whereby the picker fingers 30 are positioned adjacent the end card S of the stack 3. At this point, the signal source 42 actuates the suction source 41 to provide suction at the orifices 33 so that the forward portion of the end card S is attracted and held thereby in readiness for the withdrawing or deflecting operation. At this point, the signal source 49 operates to disengage the electromagnet 47 so that the spring 46 is operative to position the bar 45, the manifold and the picker fingers 30 in the full-line position of FIG. 1. Since the continuously rotating sprocket wheel 55 is in the line of travel of the card S during this deflecting movement and since the sprockets 61 are aligned with the longitudinally extending series of apertures 18, then the rotating sprocket wheel 55 will rapidly snatch the card S from its rest position and continuously feed said card S past the readerhead 10 with a smooth, continuous motion as a result of the engagement of the sprockets 61 with the rearwardly facing edges of the row of apertures 18 as the picker fingers 30 continue to hold the card S in engagement with said rotating sprocket wheel 55. As the forward edge of the end sheet passes the series of fiber optic elements 11, all of the photo-electric mechanisms 12 will sense darkness simultaneously thereby creating negative-going pulses which can serve to activate the reader output 3 to receive the data punched on the card S by the holes 17. Once the reading of the card S has been completed it has sufficient momentum to carry itself out of the machine and into a suitable stack 70 at the base of a forward enclosure wall 71, which serves not only to protect the working parts of the machine from dust and dirt and the like but also serves to urge the trailing edge of each card S into proper relationship to the stack 70. As the trailing edge of the card S passes the readerhead all of the elements 11** sense lightness simultaneously thereby creating positive-going pulses that can serve to restart the cycle just described. Of course, if desired, additional photo-electric means or other means can be employed to sense the leading and trailing edges of the cards to control the cyling of the sheethandling apparatus of the invention.

Referring now to FIG. 5 of the drawings, there is shown a modification of the device of the invention that pertains to the construction of the picker fingers 30, which, as before, are hollow and connected to a rotatable manifold 31 for withdrawing the forward portion of the end card S from the stack. One change from the previous embodiment discussed lies in the provision of an additional bend in the card S, which additional bend is generally represented by the reference indicia C for identification. This additional bend C results from the intersection of the suction face 32 at a slight bend angle to the rest of the picker finger 30, as indicated in this figure. The additional bending of the card S at this point C results in additional smoothing out of the card in this critical region of engagement with the sprocket wheel 55. It also allows the forwardmost portion of the card S (between points B and C) to be withdrawn from the stack prior to performing the withdrawing operation on the entire forward portion of the card S by movement of the picker fingers 30. Accordingly, in the operation of this mode of the invention, the leading edge of the card S is first flicked past the rearwardly extending projections 50 upon actuation of the suction source 41 which creates the separation of the card S along the transverse bend C and then, as further insurance that any cards that might have adhered to the end card S are not withdrawn, the picker fingers 30 are rotated as described creating the additional transverse bend B and bringing the card S into driving engagement with the sprocket wheel 55.

Referring now to FIGURES 6 and 7, there is illustrated a modification of the device of the invention wherein a variable throat generally represented by the reference numeral 80 is provided at the readerhead 10. This variable throat 80 performs the same function as the transverse bend B in the embodiment of FIG. 1 in that it maintains pressure or tension of the card S against the readerhead 10 to smooth out the card S and to form a light seal with the readerhead 10. Thus, the variable throat 80 comprises a pair of endless belts 85, 86 trained around drive pulleys 87, 88 that are mounted on the drive shaft 56 on both sides of the sprocket wheel 55. The outer periphery of the drive belts 85, 86 are positioned in the same plane as the peripheral surface 60 of the sprocket wheel 55 and thus engage the edges of the card S in driving relationship. The endless belts 85, 86 continue around remote pulleys 89, 90, respectively, that are disposed directly beneath the readerhead 10 to establish two drive points at the throat 80.

These pulleys 89, 90 are mounted on the end of a pair of cantilevers 91, 92, respectively, which cantilevers 91, 92 are supported for relative rotation at about their midpoints by the rotating drive shaft 56. A pair of springs 93, 94 urge the terminal end of the respective cantilevers 91, 92 upwardly so that the belts 85, 86 are normally in engagement with the operative surface of the readerhead 10. Then, when it is wished to withdraw the end card S from the stack, the picker fingers 30 (not shown in these figures) are rotated from the dotted-line position to the full-line position so that the card S is engaged by the sprocket wheel 55 and snatched from the stack for feeding past the readerhead 10 in the direction of the solid arrow in this figure. As the leading edge of the card S approaches the smooth curved surface 65 of the readerhead 10, the card S will force the belts 85, 86 away from the readerhead at the throat 80. The springs 93, 94 will maintain tension on the card S against the readerhead 10 by continuously urging the remote pulleys 89, 90 in the manner indicated. It will be realized that because of the fact that the outside driving peripheries of the belts 85, 86 travel at the same speed as the peripheral surface 60 of the sprocket wheel 55, the card S will be positively carried past the readerhead 10 and maintained at a constant speed during the entire time that the card S is traversing the reading station.

In summary, it will thus be seen that the sheet-handling apparatus of this invention comprises a mechanism that withdraws or deflects a portion of the end card S from the stack 3 and then in one continuous motion snatches said end card S from said stack 3 for direct feeding of the same past the adjacent readerhead 10. Further, the arrangement is such that the card S is fed at a constant speed and pressed into firm cotnact with the operative surface of the readerhead 10 so that accurate reading of the data punched on the sheet is insured. That is, the snatch means in the preferred embodiment illustrated takes the form of a sprocket wheel 55 whose sprockets 61 engage a series of aligned apertures 18 on the data card S so as to positively and rapidly remove the card from the stack 3 and present it in a continuous motion past the readerhead. The withdrawing means for removing the forward portion of the card S from the stack 3 comprises a plurality of picker fingers 30 that are pneumatically operated to attract the sheet and are rotatable about a transverse axis so that the transverse bend A is provided to smooth out the wrinkles that might be present in said card S. The picker fingers 30 are desirably spring-actuated in the direction for bringing the forward portion of the card S into engagement with the sprocket wheel 55 so that such action is limited by the force of said spring 46 to encourage engagement of the sprocket wheel 55 and the corresponding apertures 18 without adverse effect on the card.

According to one of the most important aspects of the present invention, there has been provided a sheet-handling apparatus that is relatively simple in construction and thus inexpensive to make while at the same time being reliable in operation so that handling of punch cards at remote stations for delivery of information to a centralized computer or data processing machine is now possible. Thus, in the instance where the device of the present invention is used in the merchandising field, separate card-handling means constructed in accordance with the present invention can be set up at each cashier for immediate processing of the data gained from the cards that are removed from the merchandise.

To adapt the device of the present invention to perform the punching operation, a punch head is merely substituted for the readerhead 10. In this case, the sprocket wheel 55 may be constructed with segments of sprockets rather than the continuous row of sprockets 61 to engage the pre-perforated feed apertures 18 so that intermittent motion is imparted to the card for performing the usual punching operation. The advantages mentioned in regard to the reader device are, of course, applicable to the case where such a puncher is provided.

In certain instances, it might be desirable to combine the functions of the endless belts 85, 86 and the sprocket wheel 55 whereupon a belt having sprockets attached to the outer surface would be provided in lieu of the sprocket wheel 55 to snatch the card S from its deflected position and feed it past the readerhead 10. This type of arrangement would be particularly suited for use with cards or sheets that do not possess the requisite stiffness or thickness to be effectively fed by the tangential engagement with a sprocket wheel alone since in the case where a sprocket belt is used a larger number of sprockets spaced along the operative run of the belts 85, 86 between the wheel 55 and the readerhead 10 would be drivingly engaged with the apertures 18. Also, along these lines attention is directed to FIG. 5 where it is noted that the provision of the transverse bend C at the point of engagement between the card S and the sprocket wheel 55 tends to place more sprockets 61 in engagement with more holes 18 by, in effect, bending the card S about the periphery of said wheel 55 for improved feeding of relatively flexible sheets.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. A sheet handling apparatus for operating on the bottom ones of a stack of sheets each having a row of longitudinally aligned conveyance apertures disposed between opposite edges, said apparatus including a hopper for said sheets and comprising pneumatic picker means extending across the hopper to engage the bottom sheet of said stack for deflecting the forward portion of said bottom sheet from said stack and for holding the same in a deflected position, said picker means bending said forward portion about a first axis transverse to a bottom sheet during the deflecting movement for insuring separation of the bottom sheet from said stack and for insuring substantial elimination of wrinkles that might be present in the bottom sheet, wheel means aligned with said row of apertures and including radial sprocket means for engaging the conveyance apertures in the sheets, means for continuously rotating said wheel means about a second axis transverse to the bottom sheet, said wheel means being positioned in the line of travel of the forward portion of the bottom sheet for engagement therewith at a position intermediate the ends of the sheet during said deflecting movement, said wheel means thereby being positioned to successively engage the conveyance apertures of said sheets and feeding the sheets away from said hopper by engaging the bottom sheet while held in said deflected position by said picker means and means removed from said wheel to receive the forward edge of the sheet and guide it during conveyance by said sprocket means.

2. The combination of claim 1 wherein is further provided a utilization means downstream of said wheel means, the leading edge of said utilization means being formed with a smooth surface and being positioned in the feed path of a bottom sheet during the forward movement to such an extent that the sheet is provided with a second bend in the transverse direction so as to maintain pressure by the sheet against said utilization means by the springiness of a sheet for insuring substantial elimination of the wrinkles on the sheet adjacent said utilization means and for insuring accurate placement of a sheet with respect to said utilization means.

3. The combination of claim 1 wherein said wheel means has tapered spockets spaced about the peripheral surface of said wheel and located to register in the conveyance apertures in the sheets, said sprockets having a cross-sectional area at the base substantially equal to the area of said apertures whereby sheets are aligned in the longitudinal and the transverse direction during said deflecting movement.

4. The combination of claim 1 wherein said pneumatic picker means includes a suction manifold forming said first transverse axis, finger means extending outwardly from said manifold in the forward direction, a passage extending the length of said finger means and terminating in orifice means formed in the forward end of said finger means, said passages communicating with said suction manifold whereby when suction is applied to said manifold said forward portion of a sheet may be deflected from said stack.

5. The combination of claim 4 wherein said suction maifold is journaled for rotation, and wherein is provided means for sequentially rotating said manifold to a first position to pivot said finger means so that said orifice means is adjacent said hopper for receiving a bottom sheet and then rotating said manifold in the opposite direction to a second position for effecting said deflecting movement for engagement of a bottom sheet with said wheel means.

6. The combination of claim 5 wherein said sequential rotating means comprises an arm fixed to said manifold, an electromagnet adapted to pivot said arm to rotate said manifold to said first position, and a spring biasing said arm away from said electromagnet so as to rotate said manifold to said second position upon de-activation of said electromagnet, whereby the force causing said engagement between a bottom sheet and said wheel means is limited by the strength of said spring.

7. The combination of claim 4 wherein said finger means has first and second operative surfaces positioned at an angle to each other for bending the forward portion of a bottom sheet at the intersection of said surfaces.

References Cited

UNITED STATES PATENTS

| | | | |
|---|---|---|---|
| Re. 20,541 | 10/1937 | Staude | 271—76 |
| 721,970 | 3/1903 | Sellar | 271—29 |
| 1,068,891 | 7/1913 | Green | 271—27 |
| 3,008,706 | 11/1961 | Heigl et al. | 271—29 X |
| 3,033,445 | 5/1962 | Dreyer | 226—76 X |
| 3,108,799 | 10/1963 | Clemens et al. | 271—41 |
| 3,126,199 | 3/1964 | Rosoff | 271—35 X |

EVON C. BLUNK, *Primary Examiner.*

M. L. AJEMAN, *Assistant Examiner.*

U.S. Cl. X.R.

226—76; 271—35, 41, 76